United States Patent [19]
Yoshida

[11] Patent Number: 5,923,404
[45] Date of Patent: Jul. 13, 1999

[54] IMAGE RECORDING APPARATUS WITH A PLURALITY OF PHOTOSENSITIVE MATERIAL

[75] Inventor: Futoshi Yoshida, Kanagawa, Japan

[73] Assignee: Fuji Photo Film Co., Ltd., Kanagawa, Japan

[21] Appl. No.: 08/994,428

[22] Filed: Dec. 19, 1997

[30] Foreign Application Priority Data

Dec. 25, 1996 [JP] Japan .................................. 8-346272

[51] Int. Cl.$^6$ ........................... G03B 27/72; G03B 27/80
[52] U.S. Cl. ................................ 355/27; 355/32; 355/40; 430/199
[58] Field of Search .................................. 355/35, 27, 40, 355/41, 72, 75, 32; 358/455, 465, 296, 448, 80

[56] References Cited

U.S. PATENT DOCUMENTS

| | | | |
|---|---|---|---|
| 4,734,763 | 3/1988 | Urabe et al. | 358/80 |
| 5,504,555 | 4/1996 | Yamamoto | 355/40 |
| 5,661,542 | 8/1997 | Morita | 355/27 |
| 5,699,144 | 12/1997 | Takagi | 355/35 |
| 5,748,283 | 5/1998 | Sunagawa et al. | 355/35 |

*Primary Examiner*—Safet Metjahic
*Assistant Examiner*—Peter Kim
*Attorney, Agent, or Firm*—Sughrue, Mion, Zinn, Macpeak & Seas, PLLC

[57] ABSTRACT

An average density of an image is calculated based on image data of an original and a calculated average density is compared with a previously determined threshold value. When the average density is less than or equal to the threshold value, the image is recorded on a negative photosensitive material of which density becomes higher with an increase in exposure amount. When the average density exceeds the threshold value, the image is recorded on a positive photosensitive material of which density becomes low with an increase in exposure amount. When the average density is less than or equal to the threshold value and the image is recorded on the positive photosensitive material, a density value of image data is converted to be suitable for the positive photosensitive material and when the average density exceeds the threshold value and the image is recorded on the negative photosensitive material, a density value of image data is converted to be suitable for the negative photosensitive material.

9 Claims, 8 Drawing Sheets

IMAGE RECORDING APPARATUS WITH A PLURALITY OF PHOTOSENSITIVE MATERIAL

BACKGROUND OF THE INVENTION

1. Field of the Invention

The present invention relates to an image recording apparatus in which at least one of a positive photosensitive material of which density becomes low (white) during development processing with an increase in exposure amount and a negative photosensitive material of which density becomes high (black) during development processing with an increase in exposure amount can be loaded as kinds of photosensitive materials and is conveyed onto an exposure stage, and an image is recorded on the conveyed photosensitive material in such a manner that amounts of light of three colors emitted from a light source are controlled based on image data of an original.

2. Description of the Related Art

A number of image recording apparatuses each having a digital exposure system mounted thereon has been nowadays developed. Generally, in the digital exposure system, an image is recorded on a recording medium in such a manner that a light beam outputted from a semiconductor laser is modulated with image data and the light beam is deflected by high-speed rotation of a polygon mirror (main scanning), and further the light beam reflected by the polygon mirror is subjected to sub-scanning with a galvano mirror or the like, or the above main scanning is effected repeatedly while moving the recording medium (or moving the recording medium stepwise). Here, as the recording medium, a photosensitive drum electrified by corona discharge, a plane photosensitive material, or the like may be used. Further, in place of the semiconductor laser, other light emitter such as an LED may be used as a light source.

On the other hand, the recording mediums (photosensitive materials) used by the image recording apparatus as described above can be classified into a photosensitive material having a positive characteristic and a photosensitive material having a negative characteristic.

It is generally known that the photosensitive material having a positive characteristic (hereinafter referred to as a positive photosensitive material) becomes white by exposure-development processing to facilitate reproduction of black. Further, it is generally known that the photosensitive material having a negative characteristic (hereinafter referred to as a negative photosensitive material) becomes black by exposure-development processing to facilitate reproduction of white.

In the case of the positive photosensitive material, the degree at which it becomes white is made higher with an increase of exposure amount. In the case of the negative photosensitive material, the degree at which it becomes black is made higher with an increase of exposure amount. For this reason, when white is reproduced on the positive photosensitive material and when black is reproduced on the negative photosensitive material, it is necessary to increase an amount of light emitted from a light source to the maximum level, and therefore, a problem occurs in the aspect of heat generated from the light source and durability.

In other words, these photosensitive materials have both merits and demerits. However, presently, any one of the positive and negative photosensitive materials is used (the negative photosensitive material is used more frequently than the other).

SUMMARY OF THE INVENTION

The present invention has been devised in order to solve the above-described drawbacks and an object thereof is to provide an image recording apparatus which, even when an image is recorded on a photosensitive material suitable for image data or on a photosensitive material unsuitable for image data, can reliably reproduce white or black, thereby resulting in improvement in the quality of a finished image.

The first aspect of the present invention is an image recording apparatus in which an image of an original is recorded on a photosensitive material, comprising: average density calculating means which calculates an average density of the image based on image data of the original; comparing means which compares the calculated average density with a previously determined threshold value; a loading portion in which at least one of a negative photosensitive material of which density becomes higher with an increase in exposure amount and a positive photosensitive material of which density becomes low with an increase in exposure amount is loaded in an exchangeable manner; conveying means which, when the average density is less than or equal to the threshold value, conveys the negative photosensitive material, and when the average density exceeds the threshold value, the conveying means conveying the positive photosensitive material; and a recording portion in which an image is recorded on the photosensitive material conveyed by the conveying means by controlling, based on the image data, an amount of light of multiple colors emitted from a light source.

In the first aspect of the present invention, the average density of the original image is calculated by the average density calculating means based on image data of the original. Due to the calculated average density, it is determined whether the image of the original approximates to white or black. In order to allow this determination, the comparing means compares a previously determined threshold value for classifying a white-highlighted image or a black-highlighted image with the calculated average density.

The above threshold value can be set, for example, in the range of 0.7 to 1.0, given that the density of the image is in the range of 0 to 3. As the result of comparison in the comparing means, when the average density is less than or equal to the threshold value, i.e., when it is determined that an image to be recorded is a white-highlighted image, the negative photosensitive material is conveyed and the image is recorded on the negative photosensitive material in the recording portion based on image data. The reason therefor is that white can be reproduced with a small amount of light emitted from a light source and a problem of heat generation or durability needs not to be taken into consideration.

On the other hand, as the result of comparison in the comparing means, when the average density exceeds the threshold value, i.e., when it is determined that the image to be recorded is a black-highlighted image, the positive photosensitive material is conveyed and an image is recorded on the positive photosensitive material in the recording portion based on the image data. The reason therefor is that black can be reproduced with a small amount of light emitted from the light source and a problem of heat generation or durability needs not to be taken into consideration.

As described above, according to the first aspect, a proper photosensitive material is conveyed in accordance with the average density of image data of the original, and therefore, the positive photosensitive material of which density becomes low (white) with an increase in exposure amount and the negative photosensitive material of which density becomes higher (black) with an increase in exposure amount can be properly conveyed as the kind of photosensitive material.

When an improper photosensitive material is loaded in the loading portion, the photosensitive material can be changed to a proper one by an operator based on the indication from the indicating means which indicates exchange of the photosensitive material, or the like.

Further, when the negative photosensitive material and the positive photosensitive material are both loaded in the loading portion, the conveying means can automatically select and convey the proper photosensitive material.

A second aspect of the present invention is an image recording apparatus in which an image of an original is recorded on a photosensitive material, comprising: average density calculating means which calculates an average density of the image based on image data of the original; comparing means which compares the calculated average density with a previously determined threshold value; a loading portion in which at least one of a negative photosensitive material of which density becomes higher with an increase in exposure amount and a positive photosensitive material of which density becomes low with an increase in exposure amount is loaded in an exchangeable manner; conveying means which conveys a photosensitive material loaded in the loading portion; and a recording portion in which, when the positive photosensitive material is conveyed by the conveying means and the average density is less than or equal to the threshold value, a density value of image data of an image to be recorded is converted to be suitable for the positive photosensitive material, and when the negative photosensitive material is conveyed by the conveying means and the average density exceeds the threshold value, a density value of image data of an image to be recorded is converted to be suitable for the negative photosensitive material, and further, based on the converted image data, an amount of light of multiple colors emitted from a light source is controlled so as to allow an image to be recorded on a conveyed photosensitive material.

There may be cases in which only one photosensitive material (the negative photosensitive material or the positive photosensitive material) is loaded in an image recording apparatus and in which any one of negative and positive photosensitive materials does not exist in an image recording apparatus in which the negative photosensitive material and the positive photosensitive material can both be loaded.

Accordingly, in the second aspect, when the combination of the kind of photosensitive material and image data is not proper, the density value of the image data is reversed. Namely, when the positive photosensitive material is conveyed by the conveying means and the average density is less than or equal to the threshold value, the density value of image data of an image to be recorded is converted to be suitable for the positive photosensitive material. Further, when the negative photosensitive material is conveyed by the conveying means and the average density exceeds the threshold value, the density value of image data of an image to be recorded is converted to be suitable for the negative photosensitive material. Then, the recording portion controls, based on the converted image data, an amount of light of multiple colors emitted from the light source so as to allow image recording.

In the second aspect, the designating means which designates any one of the negative photosensitive material and the positive photosensitive material as a photosensitive material on which an image is recorded is further provided and the designated photosensitive material can be conveyed by the conveying means. As described above, when the kind of photosensitive material is previously designated, the image data is made suitable for the designated photosensitive material.

When the density data of image data is reversed, the kind of photosensitive material is also changed and the designated photosensitive material is set as a proper one.

A third aspect of the present invention is a combination of the above first and second aspects. Namely, the recording portion is provided such that, when the negative photosensitive material is conveyed by the conveying means and the average density is less than or equal to the threshold value and when the positive photosensitive material is conveyed by the conveying means and the average density exceeds the threshold value, the recording portion controls, based on the image data, an amount of light of multiple colors emitted from a light source so as to allow recording of an image on a photosensitive material conveyed by the conveying means, and the recording portion is also provided such that, when the positive photosensitive material is conveyed by the conveying means and the average density is less than or equal to the threshold value, the recording portion converts a density value of image data of an image to be recorded so as to be suitable for the positive photosensitive material, and when the negative photosensitive material is conveyed by the conveying means and the average density exceeds the threshold value, the recording portion converts a density value of image data of an image to be recorded so as to be suitable for the negative photosensitive material, and further controls, based on the converted image data, an amount of light of multiple colors emitted from the light source so as to allow recording of an image on a photosensitive material conveyed by the conveying means.

As described above, the image recording apparatus according to the present invention has an excellent effect in that, even when an image is recorded on a photosensitive material suitable for an original image or even when an image is recorded on a photosensitive material unsuitable for an original image, white or black can reliably be reproduced, thereby resulting in improvement in the quality of a finished image.

BRIEF DESCRIPTION OF THE DRAWINGS

FIG. 7A is a diagram showing a control flow when image data in which light color (white) is highlighted is taken in; and FIG. 7B is a diagram showing a control flow when image data in which dark color (black) is highlighted is taken in.

DESCRIPTION OF THE PREFERRED EMBODIMENTS

Overall Structure (Exterior View)

Figure 1:
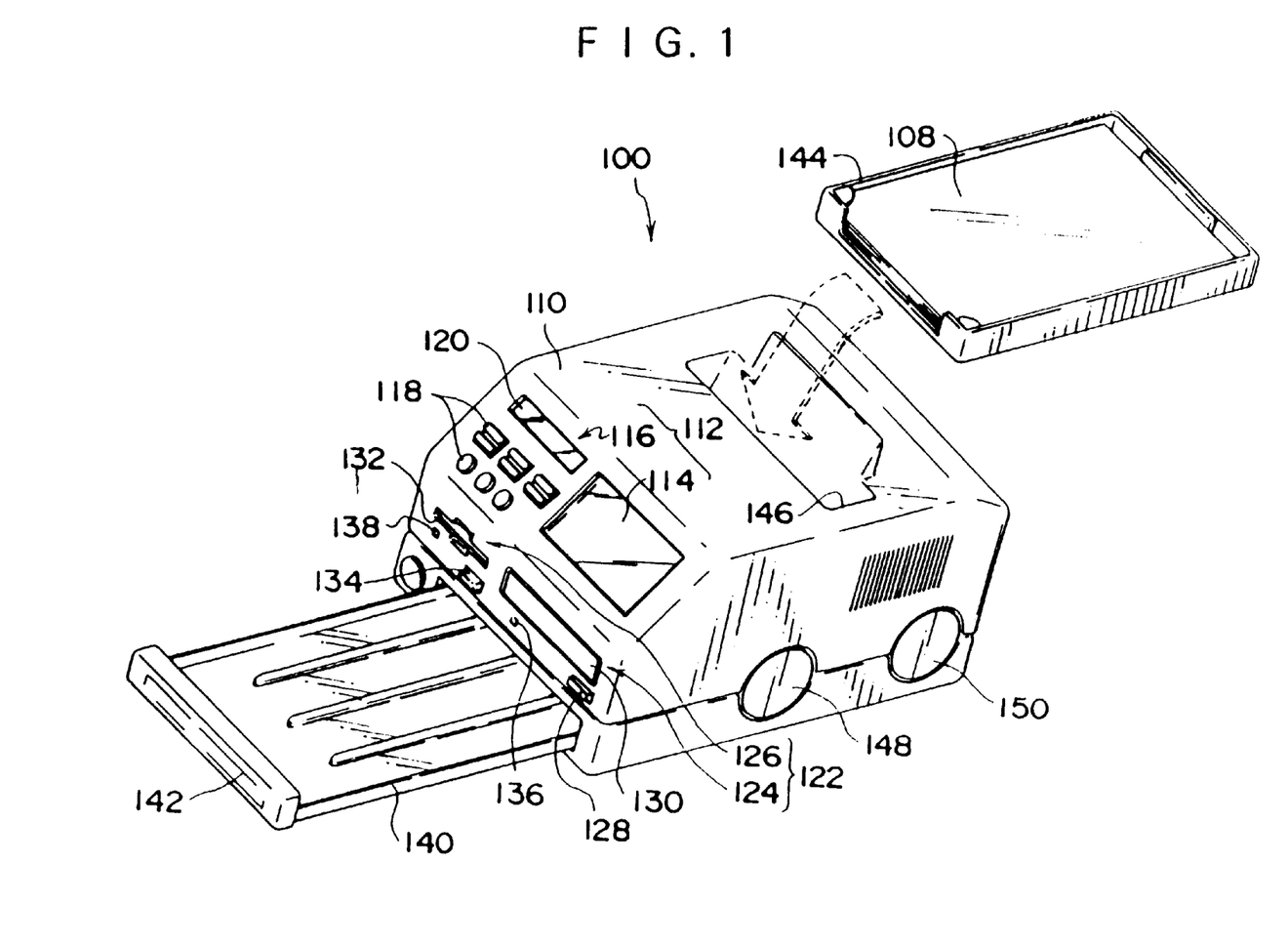
FIG. 1 is a perspective view of an image recording apparatus according to an embodiment of the present invention.
Figure 2:
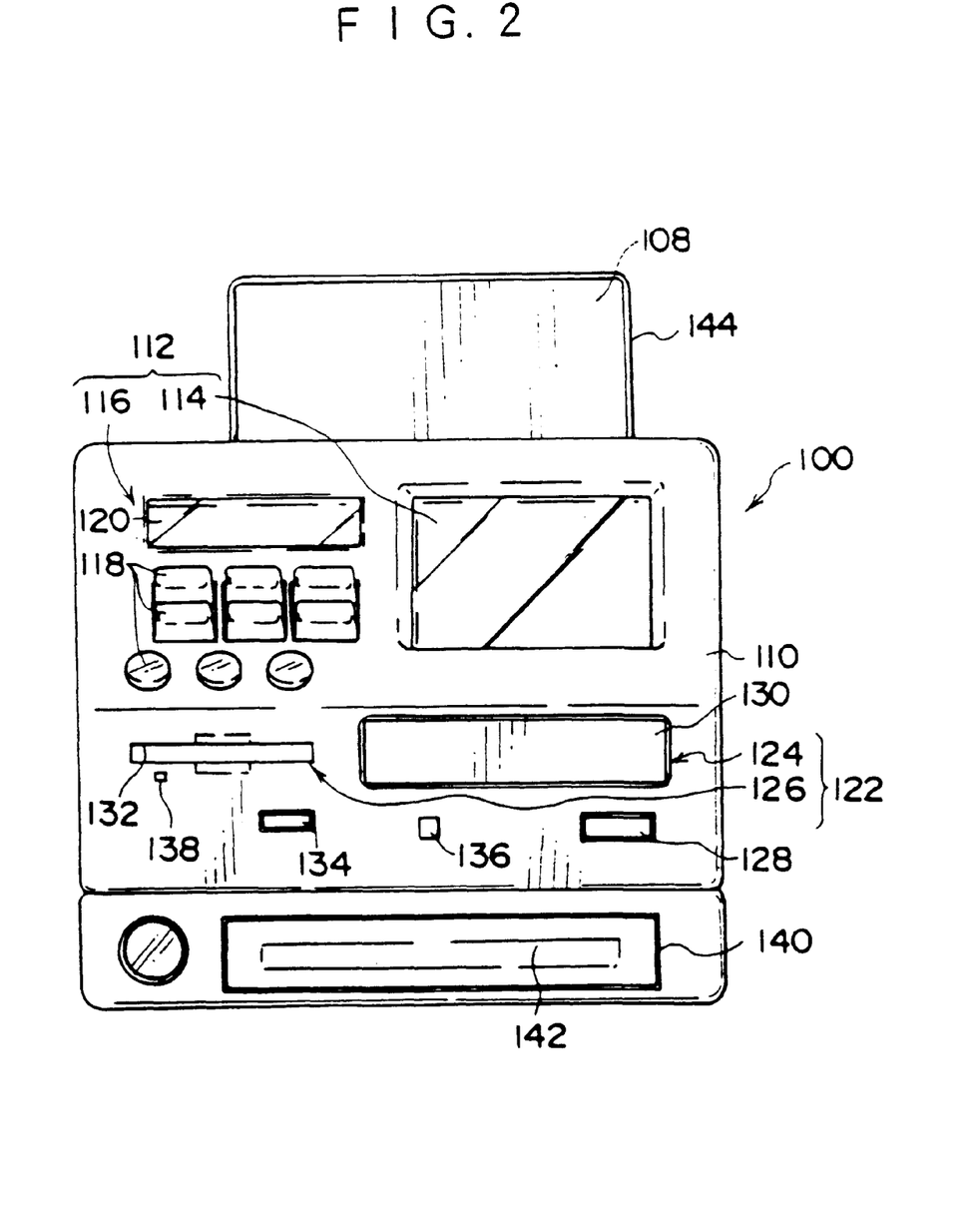
FIG. 2 is a front view of the image recording apparatus according to the embodiment of the present invention.
Figure 3:
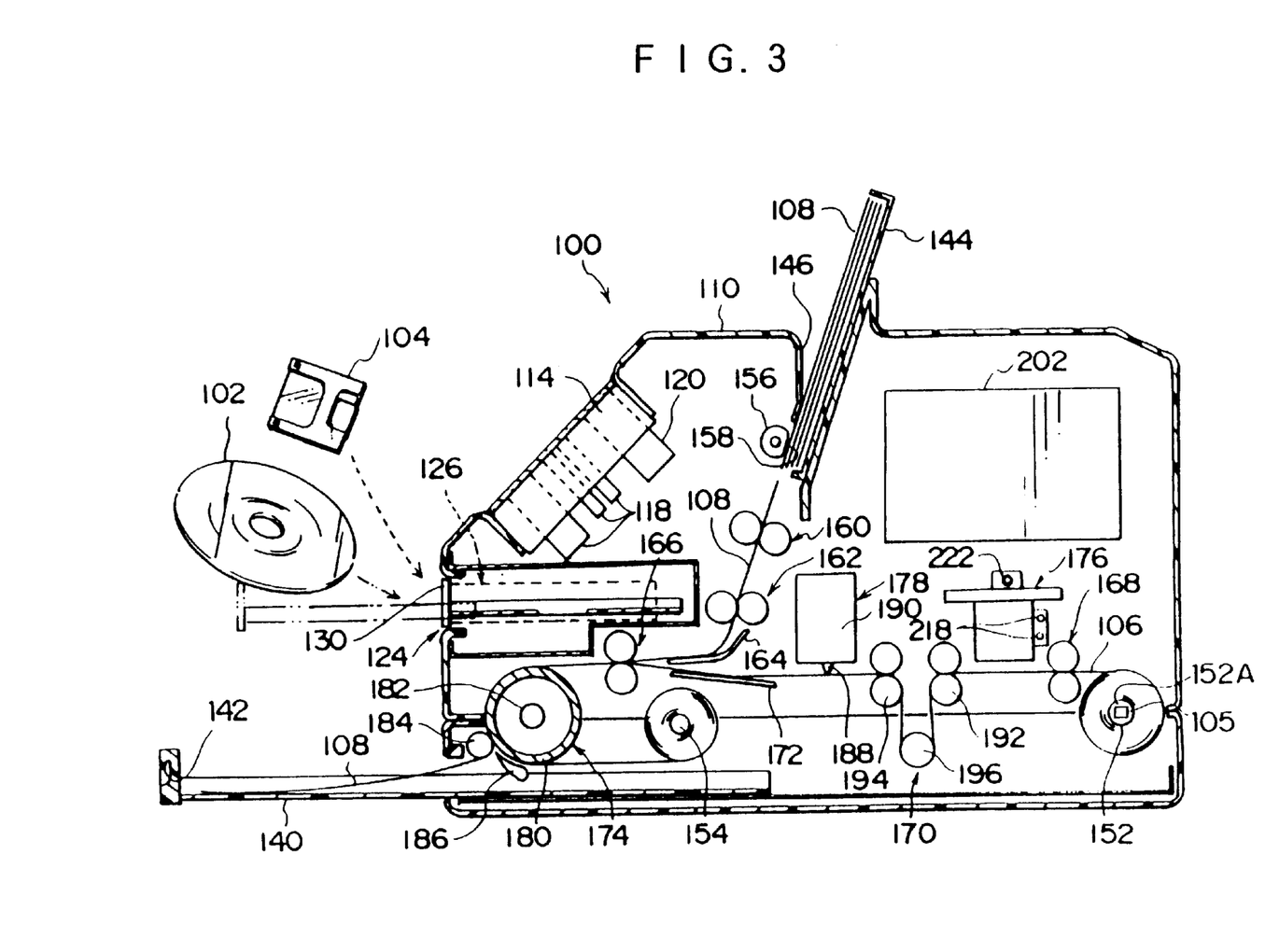
FIG. 3 is a cross-sectional side view showing an internal structure of the image recording apparatus according to the embodiment of the present invention.

Referring now to FIGS. 1 through 3, an image recording apparatus 100 according to an embodiment of the present invention is shown therein.

The image recording apparatus 100 reads image data recorded on a CD-ROM 102 or an FD 104 (which are both shown in FIG. 3) to expose onto a photosensitive material 106, and transfers an image recorded on the photosensitive material 106 to an image receiving paper 108 and outputs the image receiving paper 108.

An upper portion of the front surface of a box-shaped casing 110 (at the left side on the paper of FIG. 3) is formed as an inclined surface and an operation indicating portion 112 is provided thereon.

As shown in FIG. 2, the operation indicating portion 112 is divided into a monitor portion 114 and an input portion 116 which are disposed at right and left sides, respectively. The monitor portion 114 allows the read image to be projected thereon.

Further, the input portion 116 is formed by a plurality of operation keys 118 and a display portion 120 for confirmation of input data and can input data which is required for image recording, for example, the number of sheets to be recorded, size setting, color-balance adjustment, and negative/positive selection, and a signal for density conversion of image data (i.e., a signal for reversing a density value) by an operator's operation.

A deck portion 122 is provided below the operation indicating portion 112. The deck portion 122 is formed by an optical-disk deck portion 124 and an FD deck portion 126 which are disposed at right and left sides, respectively, on the paper of FIG. 2.

The optical-disk deck portion 124 is provided in such a manner that a tray 130 can be opened and closed by pressing an open/close button 128. An optical disk 102 can be loaded in an interior of the apparatus in such a manner as to be placed on the tray 130.

An FD insertion slot 132 is provided in the FD deck portion 126. When the FD 104 is inserted in the FD insertion slot 132, a drive system within the apparatus is actuated to insert the FD 104 into the apparatus. Further, in order to take out the FD 104 from the FD deck portion 126, an operation button 134 is pressed to pull out the FD 104.

Further, access lamps 136, 138 are respectively provided for the optical-disk deck portion 124 and the FD deck portion 126 and are each provided to be turned on during access within the apparatus.

A discharge tray 140 is provided further below the deck portion 122. The discharge tray 140 is usually accommodated within the apparatus and is provided to be pulled out by an operator's finger being put on a holding portion 142 (see FIG. 1).

The image receiving paper 108 on which the image is recorded is discharged onto the discharge tray 140.

The image receiving paper 108 is previously accommodated on a tray 144 in a layered form. The tray 144 is mounted in a tray mounting hole 146 formed on an upper surface of the casing 110. The image receiving papers 108 are taken out one by one from the tray 144 mounted in the tray mounting hole 146, and after images are transferred onto the image receiving papers 108, these image receiving papers 108 are guided to the discharge tray 140.

Two circular cover members 148, 150 are attached to the right side surface of the casing 110 (toward the front side on the paper of FIG. 1). These cover members 148, 150 are each provided to be independently removable. As shown in FIG. 3, a take-up reel 154 and a feed reel 152 onto which the rolled photosensitive material 106 is wound are disposed within the apparatus along axial directions of the cover members 148, 150, respectively. These reels 152, 154 can be taken out from or loaded into the apparatus in a state in which the covers 148, 150 are removed.

Image Receiving Paper Conveying System

As shown in FIG. 3, the tray 144 loaded in the tray mounting hole 146 is provided such that an upper surface of the leading end of the tray (at the side where the tray 144 is inserted into the tray mounting hole 146) faces a semicircular roller 156.

The semicircular roller 156 is formed in such a state that a cylindrical roller is cut along a plane parallel to an axis thereof. Usually, a cutting surface 158 of the semicircular roller 156 faces an uppermost image receiving paper 108 within the tray 144 with a space formed therebetween. When the semicircular roller 156 rotates, the image receiving paper 108 of the uppermost layer and the peripheral surface of the semicircular roller 156 contact each other, and the image receiving paper 108 is pulled out by a small amount when the semicircular roller 156 makes one rotation. The pulled-out image receiving paper 108 is nipped between a first roller pair 160 and is completely pulled out from the tray 144 by driving force of the first roller pair 160.

A second roller pair 162, a guide plate 164, and a third roller pair 166 are sequentially disposed at the downstream side of the first roller pair 160. The image receiving paper 108 is, after having been nipped by the first roller pair 160, nipped by the second roller pair 162, guided by the guide plate 164, and further nipped by the third roller pair 166.

The image receiving paper 108 overlaps with the photosensitive material 106 at the third roller pair 166. Namely, the third roller pair 166 is also used as a conveying path of the photosensitive material 106.

Photosensitive Material Conveying System

The photosensitive material 106 is accommodated in the apparatus in a state of being elongated and wound onto the feed reel 152 in a layered form. The feed reel 152 is mounted at a predetermined position in such a manner that the cover member 150 (at the rear side of the apparatus) is removed and the feed reel 152 is inserted into the apparatus in the axial direction thereof.

Two kinds of feed reels are provided as the feed reel 152 and any one of the two kinds of photosensitive materials 106 having different characteristics is wound onto each of the feed reels. Any one of the two feed reels onto which the photosensitive material is wound can be loaded in the apparatus.

As the photosensitive material 106, there are used a photosensitive material which becomes white by development processing when light is irradiated thereon, i.e., which has the property of changing into a light color with an increase in exposure amount, i.e., an amount of received light (this photosensitive material will be hereinafter referred to as a positive photosensitive material 106P as occasion demands), and a photosensitive material which becomes black by development processing when light is irradiated thereon, i.e., which has the property of changing into a dark color with an increase in exposure amount (this photosensitive material will be hereinafter referred to as a negative photosensitive material 106N as occasion demands).

As the means in which the kind of a loaded photosensitive material 106 is recognized by the apparatus, there is generally used a method in which, for example, a magazine which allows accommodation of the photosensitive material 106 wound onto the feed reel in the shape of a roll and which has various notches in accordance with the kind of photosensitive material and a plurality of limit switches provided to correspond to peripheries of the notches of the magazine mounted in the apparatus are used and the kind of the loaded photosensitive material is recognized based on an on/off state of the limit switch with the magazine being mounted in the apparatus. The recognized kind of the photosensitive material 106 is preferably indicated on a display portion or the like. Further, with the kind of the accommodated photosensitive material being indicated at a predetermined position on the magazine and also with a window being provided at an apparatus casing to allow visual understanding of a display portion of the magazine, an operator may recognize the kind of the photosensitive material from the window. In this case, after confirming the kind of the accommodated photosensitive material, the operator operates an operation key to input data which indicates the kind of the photosensitive material.

As alternative means for recognizing the kind of the photosensitive material 106, a bar code provided in the magazine may be detected, or a bar code or a notch, provided at a leading end or a transverse-direction end of the photosensitive material, may be detected. Further, the kind of the photosensitive material may be inputted manually by an operator.

In the present embodiment, as shown in FIG. 3, a mark such as a bar code, which indicates the kind of a photosensitive material wound onto the reel, is attached to an end surface 152A of the reel 152, and by detecting the mark by a sensor 105, an identification signal which indicates the kind of the photosensitive material is outputted from the sensor 105.

The above-described positive photosensitive material 106P has an advantage in reproducing a dark color with a small amount of light to restrain generation of heat of a light source (LED light source 208), which will be described later, and therefore, it is suitable for reproduction (recording) of an image in which black is highlighted. On the other hand, the negative photosensitive material 106N has an advantage in reproducing a light color with a small amount of light to restrain generation of heat of the LED light source 208, and therefore, it is suitable for reproduction of an image in which white is highlighted.

For this reason, in this embodiment, a proper photosensitive material 106 can be loaded by the operator based on density information or the like of image data of an original. Further, image data of the original can also be converted in accordance with the characteristics of the loaded photosensitive material 106, which will be described later in detail.

With the photosensitive material 106 being mounted at the predetermined position, loading of the photosensitive material 106 is effected along a predetermined conveying path with an outermost layer of the photosensitive material 106 being set as initialization. The photosensitive material 106 is loaded in such a procedure that the outermost layer thereof is pulled out from the feed reel 152, nipped by a fourth roller pair 168 in the vicinity of the feed reel 152, conveyed through a reservoir portion 170 and a guide plate 172, and is nipped by the third roller pair 166, and thereafter, the outermost layer is sequentially entrained onto a heat roller 174 and a take-up reel 154. In this case, a leader tape having a length required for loading may be provided at the leading end portion of the photosensitive material 106 wound onto the feed reel 152.

On the conveying path of the photosensitive material 106, an exposure section 176 is provided between the fourth roller pair 168 and the reservoir portion 170. Further, a water applying portion 178 is provided between the reservoir portion 170 and the guide plate 172. The exposure section 176 and the water applying portion 178 will be described later in detail. After the image has been exposed onto the photosensitive material 106 in the exposure section 176, the photosensitive material 106 is provided to overlap with the image receiving material 108 at the third roller pair 166 in a state in which water is applied to an emulsion surface (i.e., a surface to be exposed) of the photosensitive material.

Heat Roller

The heat roller 174 serves as a heat development-transfer section of the apparatus and is formed by a cylindrical roller main body 180 and a heater 182 provided within the roller main body 180 along the axial direction of the roller main body. The heat roller 174 serves to apply heat to members wound onto the roller main body 180 (i.e., the photosensitive material 106 and the image receiving material 108) in such a manner that the surface of the roller main body 180 is heated by actuation of the heater 182. The heating of the heat roller 174 enables heat development-transfer processing and the image recorded on the photosensitive material 106 is thereby transferred onto the image receiving paper 108.

A peeling roller 184 and a peeling claw 186 are disposed at a lower right side and in the vicinity of the heat roller 174 and are provided to separate, from the photosensitive material 106, the image receiving paper 108 wound onto the heat roller 174 by a length of about one third the overall circumference of the heat roller 174 to guide the image receiving paper 108 toward the discharge tray 140.

On the other hand, the photosensitive material 106 is wound onto the heat roller 174 by a length of about a half the overall circumference of the heat roller and is turned to an opposite direction to be guided to a position where the take-up reel 154 is mounted.

Water Applying Portion

As shown in FIG. 3, the water applying portion 178 operates to apply water, serving as an image forming solvent, onto the photosensitive material 106 or the image receiving paper 108 to allow overlapping surfaces of the photosensitive material 106 and the image receiving paper 108 to closely adhere to each other for heat development. The water applying portion 178 is formed by an applying member 188 extending along a transverse direction of the photosensitive material 106 and a tank 190 in which water is filled.

The applying member 188 is formed of a high water-absorptive material, for example, felt, sponge, or the like, having a proper degree of hardness and is provided to contact the photosensitive material 106 at a predetermined pressure during conveying of the photosensitive material 106. Water filled in the tank 190 is constantly supplied to the applying member 188 by a proper amount by taking advantage of capillary phenomenon. When the photosensitive material 106 and the applying member 188 contact each other, water is applied onto the surface (i.e., the emulsion surface) of the photosensitive material 106 by the applying member 188.

Further, since the applying member 188 abuts against the photosensitive material 106 at a proper pressure, water is uniformly applied to the photosensitive material 106.

Replenishment of water into the tank 190 is effected in such a manner that the entire water applying portion 178 is removed from the apparatus, but water may be constantly supplied from an exterior of the apparatus by using a pipe arrangement.

Meanwhile, in the present embodiment, water is used as the image forming solvent, but the water used in this embodiment is not limited to pure water and also includes water which is widely and generally used. Further, a mixed solvent of water and a low-boiling-point solvent such as methanol, DMF, acetone, diisobutylketone, or the like may be used. Moreover, a solution which contains an image formation accelerator, an anti-fogging agent, a development stopping agent, hydrophilic heat solvent, or the like may also be used.

Exposure Section

Figure 4:
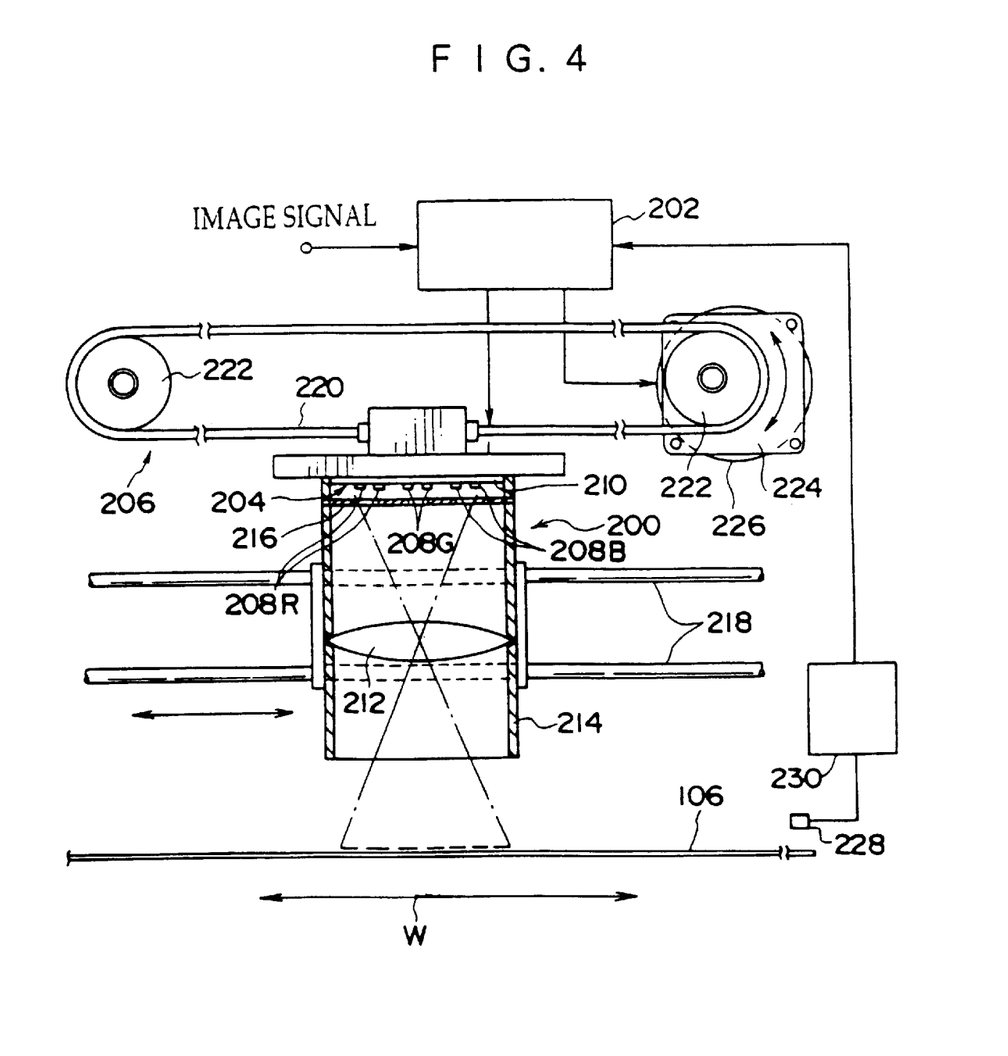
FIG. 4 is a front view showing a schematic structure of an exposure section.

FIG. 4 shows an exposure section 176 according to the present embodiment.

The exposure section 176 is mainly formed from a light source unit 200 provided above the conveying path of the photosensitive material 106 and is connected to a controller 202. The controller 202 has a memory in which an image signal (the image signal read from the optical disk 102 or FD 104) is stored and turns on a light source portion 204 within the light source unit 200 in accordance with the image signal.

Figure 6:
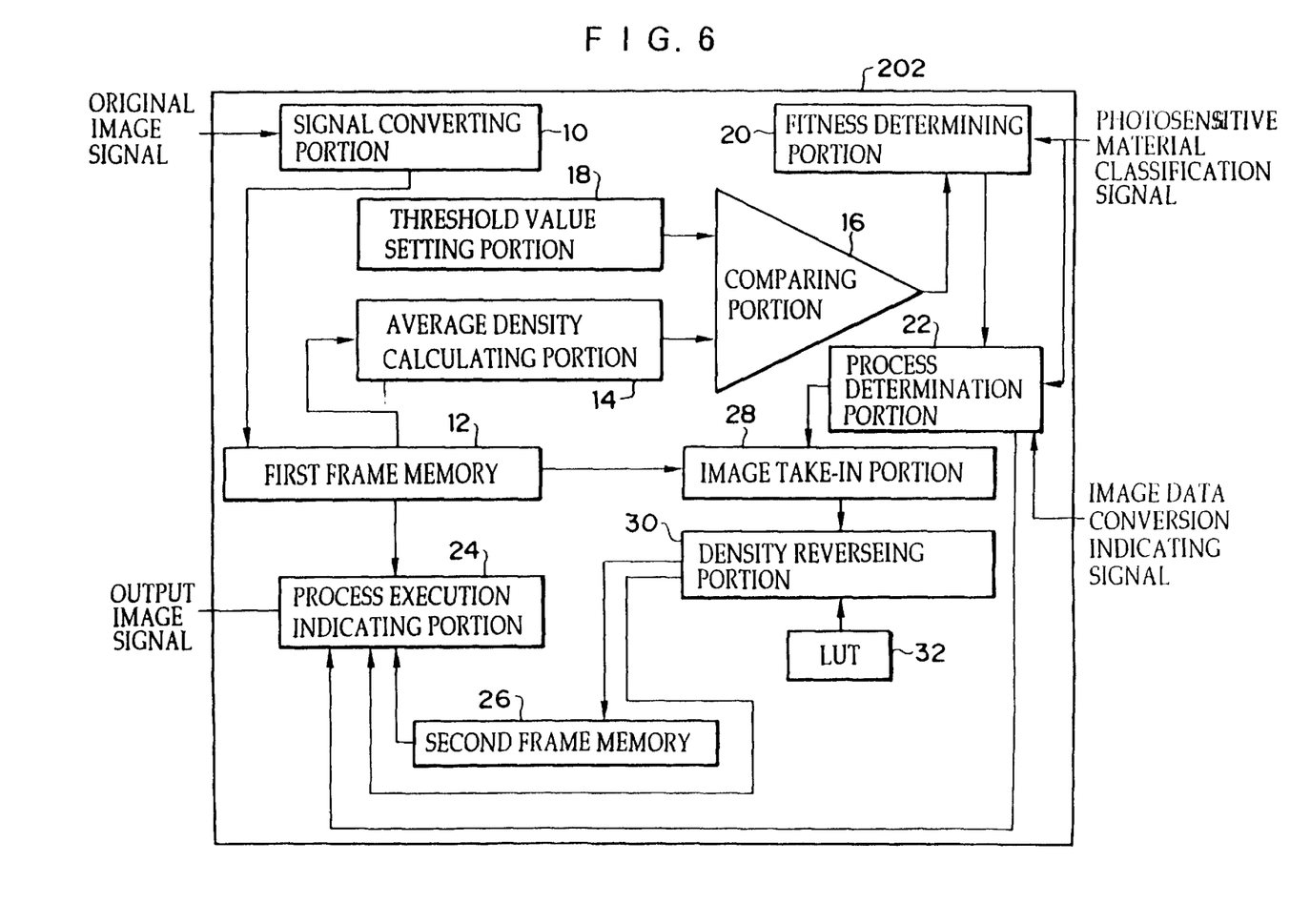
FIG. 6 is a control block diagram showing an internal function of a controller.

FIG. 6 is a control block diagram of the controller 202.

An image signal is inputted to a signal converting portion 10 and is stored, as density data, in a first frame memory 12. The first frame memory 12 is provided to store normal image data corresponding to the density of an original image.

The image data stored in the first frame memory 12 can be taken (i.e., fetched) into an average density calculating portion 14, a process execution indicating portion 24, and an image take-in portion 28. In the average density calculating portion 14, an average density of the image is calculated based on the image data stored in the first frame memory 12.

In a comparing portion 16, the calculated average density is compared with a threshold value outputted from a threshold value setting portion 18. In the threshold value setting portion 18, a numerical value which indicates a nearly medium density is previously set as a threshold value. In the present embodiment, the threshold value of approximately 0.7 to 1.0 is set given that a density region ranges from 0 to 3.

The comparison result in the comparing portion 16 is forwarded to a fitness determining portion 20. Namely, a binary signal of high level or low level is outputted from the comparing portion 16 according as the average density of an image is higher than the threshold value (a high-density image) or the average density is lower than the threshold value (a low-density image). The binary signal is inputted to the fitness determining portion 20. A signal corresponding to the kind of a currently loaded photosensitive material (i.e., a photosensitive material classification signal) is also inputted to the fitness determining portion 20 and it is determined in the fitness determining portion 20 whether combinations of these signals are proper or not. Suitability or unsuitability of each combination is as follows.

(1) combination of a high-density image and the positive photosensitive material 106P is proper (signal "1")
(2) combination of a high-density image and the negative photosensitive material 106N is not proper (signal "0")
(3) combination of a low-density image and the positive photosensitive material 106P is not proper (signal "0")
(4) combination of a low-density image and the negative photosensitive material 106N is proper (signal "1")

A signal corresponding to any of the above-described combinations (1) to (4) is outputted from the fitness determining portion 20 to a process determining portion 22. A photosensitive material classification signal which indicates the kind of the photosensitive material 106 and an image data conversion indicating signal which indicates conversion or reverse of image data from an operation key can be inputted to the process determining portion 22 so as to determine a subsequent process.

When the combination of image data and a photosensitive material is proper, the process determining portion 22 gives, to the process execution indicating portion 24, an instruction for image recording based on original image data.

On the other hand, when the combination of image data and a photosensitive material is not proper, an indication is given for the display portion 120 to change the photosensitive material 106 to a photosensitive material of a different kind or to input the image data conversion indicating signal for converting a density value of image data.

When the photosensitive material is changed to the photosensitive material of a different kind by the operator viewing the indication of the display portion 120, the kind of the changed photosensitive material is detected by the sensor 105 and the combination of image data and the photosensitive material becomes proper. As a result, the process determining portion 22 gives, to the process execution indicating portion 24, an instruction for image recording based on original image data.

When the process execution indicating portion 24 receives the instruction for image recording from the process determining portion 22, the process execution indicating portion 24 takes in the image data from the first frame memory 12 and outputs the image data for image recording processing.

Further, when the operator does not change the kind of the photosensitive material 106 and inputs the image data conversion indicating signal, the process determining portion 22 makes a determination about whether the combination of the converted image data and the photosensitive material is proper or not based on the photosensitive material classification signal and the image data conversion indicating signal. When the above combination is proper and a signal which indicates completion of the process is inputted from a density reversing portion 30 to the process execution indicating portion 24 (described later), the process determining portion 22 indicates to take in image data from the second frame memory 26. Further, the process determining portion 22 indicates to forward a signal to the image take-in portion 28 and take in image data from the first frame memory 12 to the image take-in portion 28, and further transfer the image data to the density reversing portion 30. Meanwhile, when the image data conversion indicating signal is inputted to the process determining portion 22 without making the above-described determination, the process determining portion 22 may immediately give the above-described image data take-in instruction and instruction of transferring image data to the density reversing portion 30.

In the density reversing portion 30, the density of image data is reversed, and after signal converting processing is effected based on a signal from LUT 32 in accordance with the characteristics of the photosensitive material 106 (for example, γ curve) synchronized with density reversing processing, the converted image data is transferred to and stored in the second frame memory 26.

Here, when the signal which indicates the completion of the process is inputted from the density reversing portion 30 to the process execution indicating portion 24, in the process execution indicating portion 24, image data of which density is converted is taken in and outputted for image recording processing.

The light source unit 200 is provided to be movable in the transverse direction of the photosensitive material 106 (i.e., the main scanning direction) in such a manner as to be driven by a main scanning unit 206, which will be described later. The main scanning operation is effected when the photosensitive material 106 is step-driven and stops in the exposure section 176.

The light source unit 200 of the exposure section 176 is covered by a box-shaped exposure casing 214. The light source portion 204 is disposed on the upper end surface of the exposure casing 214 and a light emission surface of the light source portion 204 is directed toward an interior of the exposure casing 214. An aperture 216 is provided for each of colors on the side of the light emission surface of the light source portion 204 to limit scattering of light from a plurality of LED chips 208. Meanwhile, the structure having no aperture 216 may also be provided.

A telecentric lens 212 is provided on the lower side of the apertures 216 and at the central portion of the exposure casing 214 and serves to converge light from the light source portion 204 to form an image on the photosensitive material 106. Meanwhile, the resolution of an image thus formed is about 250 to 400 dpi.

The telecentric lens 212 is formed by a plurality of lenses and a diaphragm and has characteristics in which magnification thereof does not vary even when the height of an image surface changes. The telecentric lens 212 can eliminate vibration generated during the main scanning movement made by the main scanning unit 206, and an error caused by a state in which the exposure casing 214 is mounted.

Further, the focus of the telecentric lens 212 is constantly adjusted by an automatic focusing mechanism (not shown). Alternatively, the telecentric lens 212 may also be formed as a lens system whose depth of focus is large so as to eliminate the need of adjustment of the focus.

The light source portion 204 is supported by a pair of guide shafts 218 disposed parallel to each other and forming a part of the main scanning unit 206. These guide shafts 218 are provided along the transverse direction of the photosensitive material 106 (i.e., the direction indicated by arrow W in FIG. 4). The light source portion 204 is guided by the guide shafts 218 so as to be movable in the transverse direction of the photosensitive material 106.

A portion of an endless timing belt 220 is fixed at the exposure casing 214 of the light source portion 204. The timing belt 220 is entrained onto sprockets 222 positioned in the vicinities of both ends of the pair of guide shafts 218. The rotating shaft of one of the sprockets 222 is connected via a transmission 224 to the rotating shaft of a stepping motor 226. Due to reciprocating rotation of the stepping motor 226, the light source portion 204 is moved along the guide shafts 218 in a reciprocating manner.

The drive of the stepping motor 226 is controlled by the controller 202 and is synchronized with the step driving of the photosensitive material 106. Namely, in the state in which the photosensitive material 106 is moved by one step and stops, the stepping motor 226 starts rotating to move the light source portion 204 on the photosensitive material 106 along the transverse direction of the photosensitive material 106. When the stepping motor 226 is rotated in the reverse direction after a predetermined number of pulses has been confirmed, the light source portion 204 returns to its original position. Subsequent movement of the photosensitive material 106 starts synchronously with the returning motion of the light source portion 204.

A photodiode 228 is provided at the side where light is emitted from the light source portion 204 so as to face the photosensitive material 106 and outputs a signal corresponding to a quantity of light from the light source portion 204 in which light has been received. The photodiode 228 is connected to a light-quantity correction unit 230 and the signal corresponding to the quantity of light is inputted to the light-quantity correction unit 230.

The light-quantity correction unit 230 compares the quantity of light from the LED chips 208 of each of the detected colors with a quantity-of-light value predicted from a correcting fixed signal to adjust density and color balance, and further outputs a correction value to the controller 202. The image signal to be transmitted to the light source portion 204 is corrected based on the correction value and each LED chip 208 is turned on at a proper quantity of light.

Figure 5:
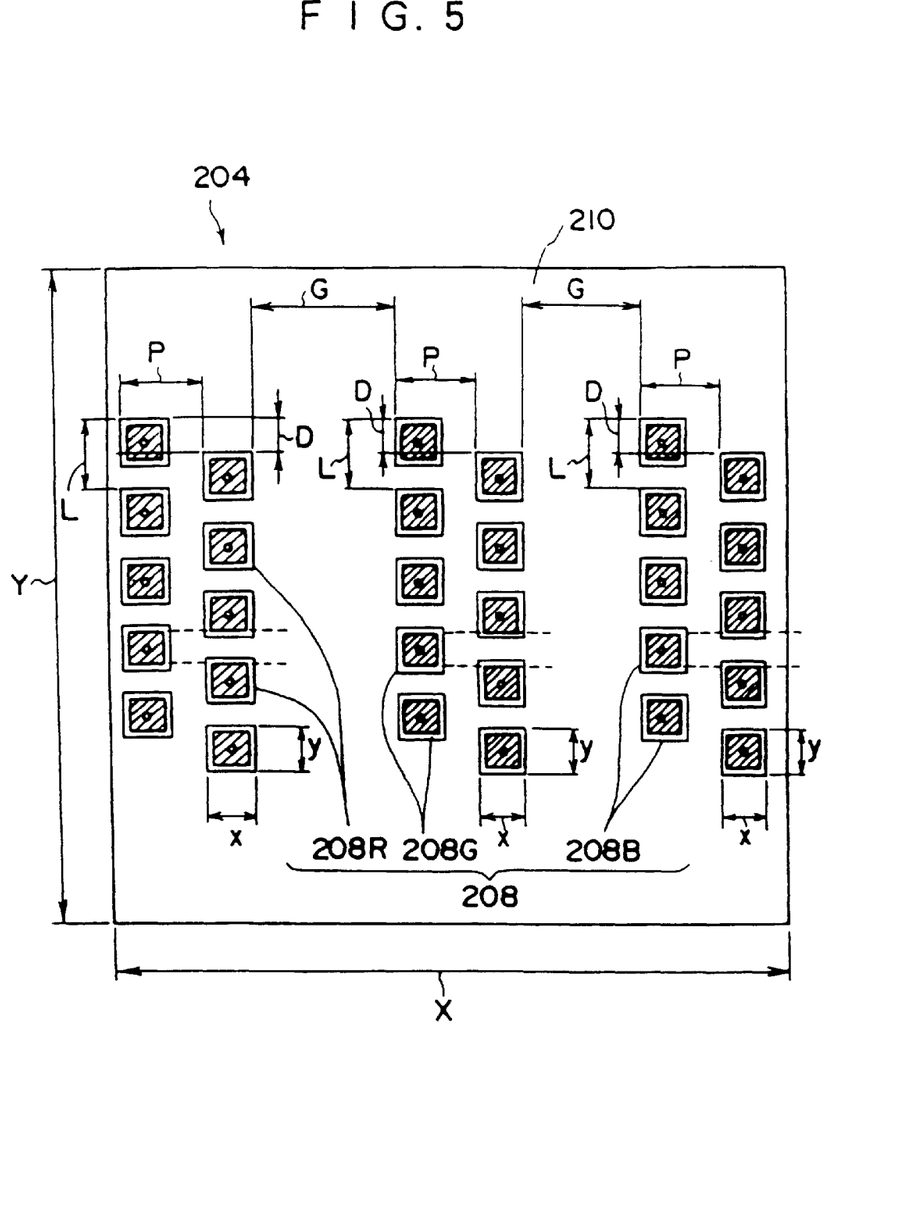
FIG. 5 is a plan view showing a light source portion of the exposure section.

As shown in FIG. 5, the light source portion 204 is formed with the plurality of LED chips 208 being arranged in groups. These LED chips 208 which emit light of colors of blue (B), green (G), and R (red) (when described below for each of the colors, the LED chip which emits light of blue is referred to as B-LED chip 208B, the LED chip which emits light of green is referred to as G-LED chip 208G, and the LED chip which emits light of red is referred to as R-LED chip 208R) are mounted onto a substrate 210 along the transverse direction of the photosensitive material 106 (i.e., the main scanning direction) for each of the colors in accordance with the same arrangement rule. Meanwhile, the wavelength of light from the R-LED chip 208R is 650±20 nm, the wavelength of light from the G-LED chip 208G is 530±30 nm, and the wavelength of light from the B-LED chip 208G is 470±20 nm.

On the substrate 210 in the plan view shown in FIG. 5, ten B-LED chips 208B are arranged in two rows and in a zigzag manner at the right end, ten R-LED chips 208R are arranged in two rows and in a zigzag manner at the left end, and ten G-LED chips 208G are arranged in two rows and in a zigzag manner at the central position. Namely, the totaled six rows of LED chips 208 are arranged.

A predetermined wiring arrangement is provided on the substrate 210 by etching processing or the like and each wire is covered by metal for heat dissipation so as not to cause a short circuit between the wires. For this reason, generation of heat due to the LED chips 208 being turned on can be restricted and variation of an amount by which light is emitted can also be limited.

The dimensions of each of parts of the light source portion 204 applied to the present embodiment are as follows.

The horizontal and vertical dimensions (XXY) of the substrate 210 are 5×5 mm (maximum) and the dimensions of each LED chip 208 (x×y) are about 360×360 μm. The row pitch P of the same color LED chips is 600 μm, the line pitch L of each row of the LED chips is 520 μm, and the distance D of a stepped portion formed in the zigzag arrangement along the vertical direction of the substrate is 260 μm. The distance G of a space between the adjacent groups of LED chips cannot be determined univocally, but is determined by the telecentric lens 212. Preferably, the respective distances G between the R-LED chips 208R and the G-LED chips 208G and between the G-LED chips 208G and the B-LED chips 208B are equal to each other.

The diagonal line section of each of the LED chips 208 shown in FIG. 5 is a region from which light is actually emitted. As shown in the diagonal lines shown in FIG. 5, borders of the light emission region in the adjacent rows of LED chips are provided to coincide with each other.

The light source portion 204 having above-described structure allows recording of ten main scanning lines by one main scanning operation for each of the colors. For this reason, step movement of the photosensitive material 106 is controlled such that the photosensitive material 106 is driven and stopped repeatedly at a pitch of ten times the width of a main scanning line recorded thereon.

Reservoir Portion

The reservoir portion 170 is, as described above, disposed between the exposure section 176 and the water applying portion 178 and is formed by two pairs of nip rollers 192, 194 and one dancer roller 196. The photosensitive material 106 is entrained between the two pairs of nip rollers 192, 194 and a substantially U-shaped slack portion is formed in the photosensitive material 106 between these pairs of nip rollers. The dancer roller 196 moves up and down correspondingly to the slack portion to hold the slack portion of the photosensitive material 106.

In the exposure section 176, the photosensitive material 106 is moved in a stepwise manner, but in the water applying portion 178, it is necessary that the photosensitive material 106 be conveyed at a fixed speed so as to allow uniform application of water onto the photosensitive material 106. For this reason, the difference in the conveying speed of the photosensitive material 106 is generated between the exposure section 176 and the water applying portion 178. In order to eliminate the difference in the conveying speed, the dancer roller 196 moves up and down to adjust an amount of slack formed in the photosensitive material 106 so that the stepwise movement and the constant-speed movement of the photosensitive material 106 can be carried out synchronously.

Next, an operation of the present embodiment will be described.

An overall flow of an image recording operation will be first described.

In the state in which the tray 144 is loaded in the tray mounting hole 146 and the feed reel 152 onto which the photosensitive material 106 is completely taken up and the take-up reel 154 which is in an empty state are mounted at respective predetermined positions, when a printing start key of the operation indication portion 112 is operated, the controller 202 reads and stores image data from the optical disk 102 or the FD 104.

When the image data is stored in the controller 202, the feed reel 152 is driven to start conveying the photosensitive material 106.

When the photosensitive material 106 reaches a predetermined position in the exposure section 176, the photosensitive material 106 is stopped temporarily and image signals of ten lines are outputted from the controller 202 to the light source portion 204. The image signals are outputted every ten lines and the light source portion 204 is guided by the guide shaft 218 by drive of the stepping motor 226 to move along the transverse direction of the photosensitive material 106 (main scanning). Prior to the outputting of the image signal, the quantity of light for each of the colors from the light source portion 204 is detected by the photodiode 228, and in the light-quantity correction unit 230, a correction value for adjustment of density, color balance, and the like is supplied for the controller 202, to thereby correct the image signal. The correction of the image signal is made for each image.

When first main scanning is completed, the photosensitive material 106 is moved by one step (10-line pitch) and stops, and subsequently, second main scanning is effected. By repeating the above main scanning, an image of one frame is recorded on the photosensitive material 106. The photosensitive material 106 on which the image has been recorded is held by drive of only upstream side nip roller pair 192 in the reservoir portion 170 (a downstream side nip roller pair 194 is stopped) in the state of having a slack portion in the reservoir portion 170 to be entrained onto the dancer roller 196. For this reason, the above photosensitive material 106 is not provided to reach the water applying portion 178.

When the photosensitive material 106 having a length of one image is accumulated in the reservoir portion 170, the nip roller pair 194 at the downstream side of the reservoir portion 170 starts driving. As a result, the photosensitive material 106 (recording of images thereon has been completed) is conveyed to the water applying portion 178. In the water applying portion 178, the photosensitive material 106 is conveyed at a constant speed and water is uniformly applied to the photosensitive material by the applying member 188.

Water is constantly conveyed from the tank 190 to the applying member 188 and the photosensitive material 106 is pressed by the applying member 188 at a predetermined pressure. For this reason, a proper amount of water is applied to the photosensitive material 106.

The photosensitive material 106 to which water is applied is guided by the guide plate 172 and is conveyed to the third roller pair 166.

On the other hand, the peripheral surface of the semicircular roller 156 and the leading end of the image receiving paper 108 contact each other due to one rotation of the semicircular roller 156, and the image receiving paper 108 of the uppermost layer is pulled out and is nipped by the first roller pair 160. The image receiving paper 108 is pulled out from the tray 144 by being driven by the first roller pair 160 and waits for arrival of the photosensitive material 106 in the state of being nipped by the second roller pair 162.

Synchronously with the passing of the photosensitive material 106 through the guide plate, the first roller pair 160 and the second roller pair 162 start driving and the image receiving paper 108 is guided by the guide plate 164 and conveyed to the third roller pair 166.

The photosensitive material 106 and the image receiving paper 108 are nipped by the third roller pair 166 in an overlapping state and are conveyed to the heat roller 174. At this time, the photosensitive material 106 and the image receiving paper 108 closely adhere to each other by water applied to the photosensitive material 106.

The photosensitive material 106 and the image receiving paper 108 in the overlapping manner are entrained onto the heat roller 174 and is subjected to heat from the heater 182 for heat development-transfer processing. In other words, the image recorded on the photosensitive material 106 is transferred onto the image receiving paper 108 so as to form an image on the image receiving paper 108.

The heat development-transfer processing is completed in the state in which the image receiving paper 108 is wound onto the heat roller 174 by a length of about one third the entire circumference of the roller, and subsequently, the image receiving paper 108 is separated from the photosensitive material 106 by the peeling roller 184 and the peeling claw 186, and is discharged onto the discharge tray 140 in the state of being wound onto the peeling roller 184.

On the other hand, the photosensitive material 106 is wound onto the heat roller 174 by a length of about a half the overall circumference of the roller, and thereafter, the photosensitive material 106 moves in the tangential direction and is wound onto the take-up reel 154.

Here, since there exist original images each in which a light color or a dark color is highlighted, it is preferable to select the photosensitive material 106 which is suitable for each of the above original images. In the present embodiment, it is possible to confirm about whether the loaded photosensitive material 106 is proper or not for the image data by the display of the display portion 120. For this reason, in the case of an image in which a light color is highlighted, the operator can select the negative photosensitive material 106N. Further, in the case of an image in which a dark color is highlighted, the operator can select the positive photosensitive material 106P, namely, any selected photosensitive material 106 can be loaded in the apparatus. When the proper photosensitive material 106 is set for an image, useless lighting of the LED light source 208 in a heavy current state can be alleviated and non-uniformity of an amount of light due to generation of heat and deterioration in image quality can be prevented.

Although it is most preferable that the photosensitive material 106 is changed for each image, there exists a case in which replacement of the photosensitive material 106 is not allowed (for example, having no photosensitive material in stock or giving an operator no instruction for replacement). For this reason, the process determining portion 22 can convert the density value of original image data in accordance with the kind of the loaded photosensitive material 106. The conversion of the density of image data can be, as described above, executed by the instruction of the process determining portion 22 based on the image data conversion indicating signal inputted by the operator. However, when the signal which indicates unsuitability is inputted from the fitness determining portion 20, it suffices that the process determining portion 22 automatically executes density conversion without the operator giving an instruction for input of the image data conversion indicating signal.

Next, the conversion of density of image data will be described in detail.

Figure 7A:
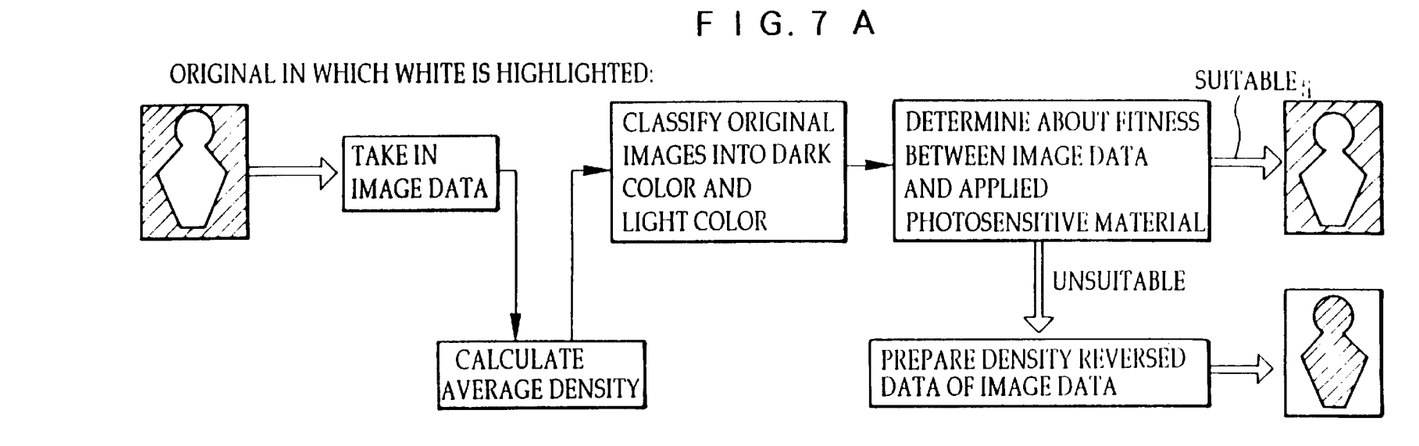

FIG. 7A shows a flow diagram of image data in the case of an original image with light color (white) highlighted. Namely, when original image data is taken in, the average density of the image is calculated in the average density calculating portion 14 and is compared with a threshold value (0.7 to 1.0) previously determined in the comparing portion 16, and then, the image is determined as an image which approximates to white. Next, the fitness determining portion 20 makes a determination about fitness between the image data and the loaded photosensitive material 106. When the proper photosensitive material 106 (namely, in this case, the negative photosensitive material 106N) is loaded, the taken-in image data is used as it is and the image is recorded thereon.

On the other hand, when it is determined that the photosensitive material 106 is not proper as the result of determination about the fitness, the density of image data is reversed in the density reversing portion 30 and reverse density data is thereby prepared. In this case, as shown in FIG. 6, the reverse density data is converted by a predetermined lookup table (LUT) in accordance with the characteristics of the photosensitive material 106. Since the density of the above prepared data is reversed, even if the positive photosensitive material 106P is loaded, the image data suitable for the positive photosensitive material 106P is provided.

Figure 7B:
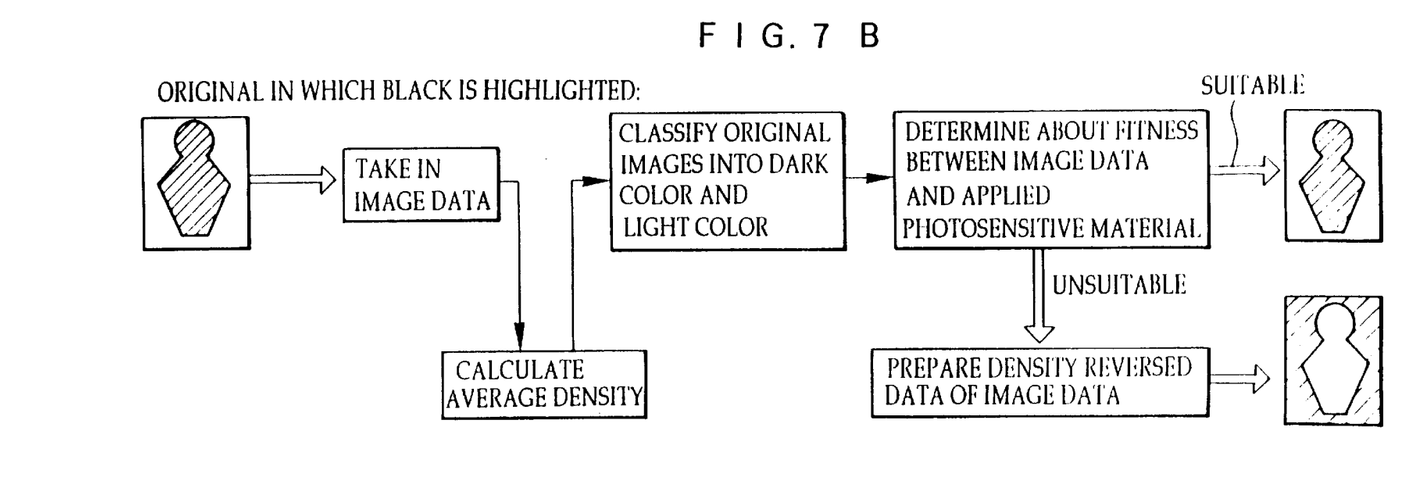

FIG. 7B shows a flow diagram of image data in the case of an original image with dark color (black) highlighted. The operation shown herein is the same as that in FIG. 7A. Namely, when original image data is taken in, the average density of the image is calculated and is compared with a previously determined threshold value (0.7 to 1.0), and then the image is determined as an image which approximates to black. Next, a determination is made about the fitness between the image data and the loaded photosensitive material 106. When the proper photosensitive material 106 (namely, in this case, the positive photosensitive material 106P) is loaded, the taken-in image data is used as it is. On the other hand, when it is determined that the photosensitive material 106 is not proper as the result of determination about the fitness, the density of image data is reversed and reverse density data is thereby prepared. Even in this case, as shown in FIG. 6, the reverse density data is converted by a predetermined LUT in accordance with the characteristics of the photosensitive material 106. Since the density of the above prepared data is reversed, even if the negative photosensitive material 106N is loaded, the image data suitable for the negative photosensitive material 106N is provided.

In the above-described embodiment, the photosensitive material can reliably be set so as to be suitable for the image data by effecting any one of an operation in which the photosensitive material 106 is selected and loaded in accordance with the density of the taken-in original image data and an operation in which the fitness of the photosensitive material 106 already loaded is determined in accordance with the density of original image data, and when the photosensitive material is not suitable for the image data, the density of the image data is reversed to correspond to the kind of the loaded photosensitive material 106. For this reason, output amount of light from the LED light source 208 (i.e., output current) can be restrained to the minimum and energy saving can be achieved accordingly. Further, unevenness of density of an image caused by generation of heat can be prevented to improve the quality of the image. Moreover, the durability of the LED light source 208 can also be improved.

Figure 8:
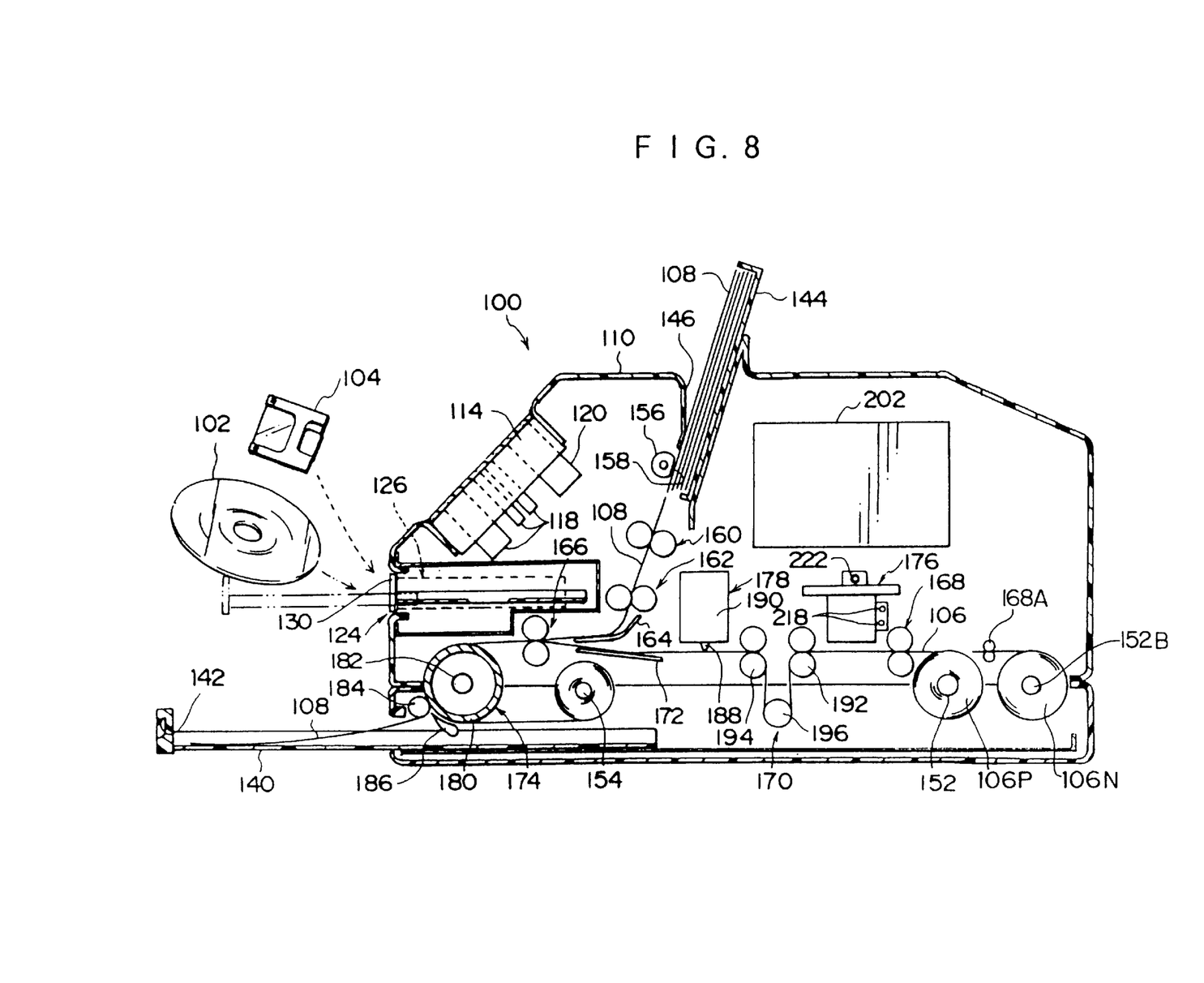
FIG. 8 is a cross-sectional side view showing a modified example of an image recording apparatus in which two kinds of photosensitive materials can be loaded synchronously.

Meanwhile, the present embodiment was described with the apparatus in which only one kind of photosensitive material 106 can be loaded being given as an example. However, as shown in FIG. 8, an apparatus in which two kinds of photosensitive materials 106 can be loaded may also be applied. For example, photosensitive material 106P is loaded on feed reel 152 and photosensitive material 106N is loaded on feed reel 152B. In this case, when the two kinds of photosensitive materials 106 are both loaded, any one of them may be automatically selected and pulled out to the exposure section 176 via the fourth roller pairs 168 and/or fifth roller pairs 168A. Further, when any one photosensitive material 106 (which is suitable for the image data) does not exist, the density of the image data is reversed automatically or by an operator's instruction and an image is recorded on an existing photosensitive material 106.

In addition, the present embodiment is provided such that the optical-disk deck portion 124 and the FD deck portion 126 are loaded in the apparatus, but a deck portion in which other recording medium (for example, a photo-magnetic disk (MO), a phase-change disk (PD), a video tape, and the like) can be loaded may also be provided. Further, an image input terminal which is used to take in an image signal from an exterior (for example, a personal computer, a television, and the like) can also be provided.

What is claimed is:

1. An image recording apparatus in which an image of an original is recorded on a photosensitive material, comprising:

average density calculating means which calculates an average density of the image based on image data of the original;

comparing means which compares the calculated average density with a previously determined threshold value;

a loading portion in which at least one of a negative photosensitive material of which density becomes higher with an increase in exposure amount and a positive photosensitive material of which density becomes low with an increase in exposure amount is loaded in an exchangeable manner;

conveying means which, when the average density is less than or equal to the threshold value, conveys the negative photosensitive material loaded in said loading portion, and when the average density exceeds the threshold value, said conveying means conveys the positive photosensitive material loaded in said loading portion; and a recording portion in which an image is recorded on the photosensitive material conveyed by said conveying means by controlling, based on the image data, an amount of light of multiple colors emitted from a light source.

2. An image recording apparatus according to claim 1, further comprising:

indicating means for indicating exchange of the photosensitive material, the photosensitive material when improper photosensitive material is loaded being exchanged by an operator in accordance with an indication of said indicating means.

3. An image recording apparatus according to claim 1, wherein when the negative photosensitive material and the positive photosensitive material are both loaded in said loading portion, said conveying means selectively conveys the negative photosensitive material with the average density being less than or equal to the threshold value and also selectively conveys the positive photosensitive material with the average density exceeding the threshold value.

4. An image recording apparatus according to claim 3, further comprising:

detecting means which detects about whether the photosensitive material loaded in said loading portion is a negative photosensitive material or a positive photosensitive material, wherein said conveying means automatically selects the photosensitive material based on a detection result of said detecting means.

5. An image recording apparatus in which an image of an original is recorded on a photosensitive material, comprising:

average density calculating means which calculates an average density of the image based on image data of the original;

comparing means which compares the calculated average density with a previously determined threshold value;

a loading portion in which at least one of a negative photosensitive material of which density becomes higher with an increase in exposure amount and a positive photosensitive material of which density becomes low with an increase in exposure amount is loaded in an exchangeable manner;

conveying means which conveys a photosensitive material loaded in said loading portion; and a recording portion in which, when the positive photosensitive material is conveyed by said conveying means and the average density is less than or equal to the threshold value, a density value of image data of an image to be recorded is converted to be suitable for the positive photosensitive material, and when the negative photosensitive material is conveyed by said conveying means and the average density exceeds the threshold value, a density value of image data of an image to be recorded is converted to be suitable for the negative photosensitive material, and further, based on the converted image data, an amount of light of multiple colors emitted from a light source is controlled so as to allow an image to be recorded on a conveyed photosensitive material.

6. An image recording apparatus according to claim 5, wherein when the negative photosensitive material and the positive photosensitive material are both loaded in said loading portion, said conveying means conveys any one of the negative photosensitive material and the positive photosensitive materials.

7. An image recording apparatus according to claim 5, further comprising:

designating means for designating any one of the negative photosensitive material and the positive photosensitive material as a photosensitive material on which an image is recorded, wherein said conveying means conveys a photosensitive material designated by said designating means.

8. An image recording apparatus in which an image of an original is recorded on a photosensitive material, comprising:

average density calculating means which calculates an average density of the image based on image data of the original;

comparing means which compares the calculated average density with a previously determined threshold value;

a loading portion in which at least one of a negative photosensitive material of which density becomes higher with an increase in exposure amount and a positive photosensitive material of which density becomes low with an increase in exposure amount is loaded in an exchangeable manner;

conveying means which conveys a photosensitive material loaded in said loading portion; and a recording portion which, when the negative photosensitive material is conveyed by said conveying means and the average density is less than or equal to the threshold value and when the positive photosensitive material is conveyed by said conveying means and the average density exceeds the threshold value, controls, based on the image data, an amount of light of multiple colors emitted from a light source so as to allow recording of an image on a photosensitive material conveyed by said conveying means, said recording portion being also provided such that, when the positive photosensitive material is conveyed by said conveying means and the average density is less than or equal to the threshold value, said recording portion converting a density value of image data of an image to be recorded so as to be suitable for the positive photosensitive material, and when the negative photosensitive material is conveyed by said conveying means and the average density exceeds the threshold value, said recording portion converting a density value of image data of an image to be recorded so as to be suitable for the negative photosensitive material, and further controlling, based on the converted image data, an amount of light of multiple colors emitted from the light source so as to allow recording of an image on a photosensitive material conveyed by said conveying means.

9. An image recording apparatus according to claim 8, further comprising:

designating means for designating any one of the negative photosensitive material and the positive photosensitive material as a photosensitive material on which an image is recorded, wherein said conveying means conveys a photosensitive material designated by said designating means.

* * * * *